United States Patent [19]

Scheidler

[11] 4,041,363
[45] Aug. 9, 1977

[54] DUAL BATTERY CHARGE CONTROL

[76] Inventor: Ralph E. Scheidler, 12712 SE. Flavel St., Portland, Oreg. 97236

[21] Appl. No.: 614,850

[22] Filed: Sept. 19, 1975

Related U.S. Application Data

[63] Continuation of Ser. No. 477,593, June 10, 1974, abandoned.

[51] Int. Cl.$^2$ .............................................. H02J 7/14
[52] U.S. Cl. ...................................... 320/15; 320/17; 320/61; 322/28
[58] Field of Search .............................. 320/7, 15–18, 320/39, 40, 64; 322/28

[56] References Cited

U.S. PATENT DOCUMENTS

| 3,624,480 | 11/1971 | Campbell et al. | 320/15 |
| 3,809,995 | 5/1974 | Hardin | 322/90 X |

*Primary Examiner*—Robert J. Hickey
*Attorney, Agent, or Firm*—Eugene M. Eckelman

[57] ABSTRACT

Two series-connected batteries are connected across the power and ground terminals of an alternator and a silicon controlled rectifier selectively connects said power terminal to the junction between the batteries. A turn-on control circuit for the silicon controlled rectifier is connected across the battery providing the higher voltage output to effect conduction of the silicon controlled rectifier when the voltage drop across said battery reaches a predetermined value, whereby to direct charging current from the alternator only through the battery providing the lower voltage output. A turn-off control circuit for the silicon controlled rectifier also may be provided to connect the series batteries to the power input of a voltage regulator to effect deactivation of the alternator and silicon controlled rectifier when the voltage drop across the higher voltage output battery decreases a predetermined amount with respect to the voltage drop across the lower voltage output battery, the turn-off control circuit also functioning to activate the voltage regulator, alternator and silicon control rectifier when the voltage across the lower voltage output battery starts to drop, thereby re-establishing charging through both batteries.

12 Claims, 4 Drawing Figures

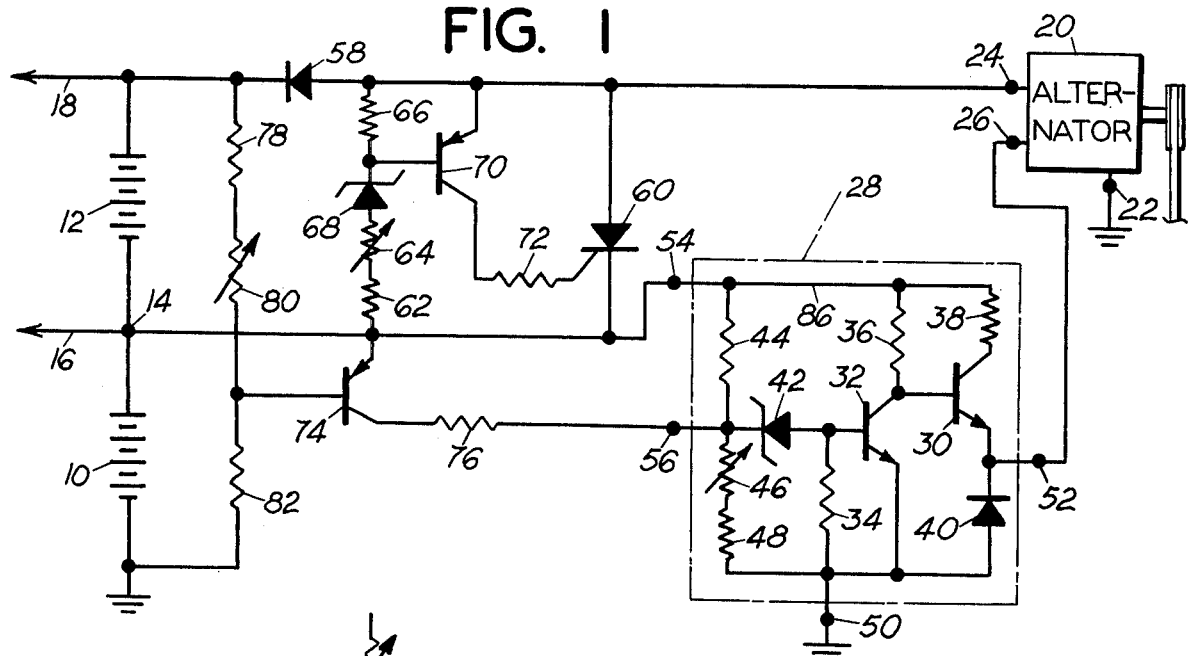
FIG. 1
FIG. 2
FIG. 3
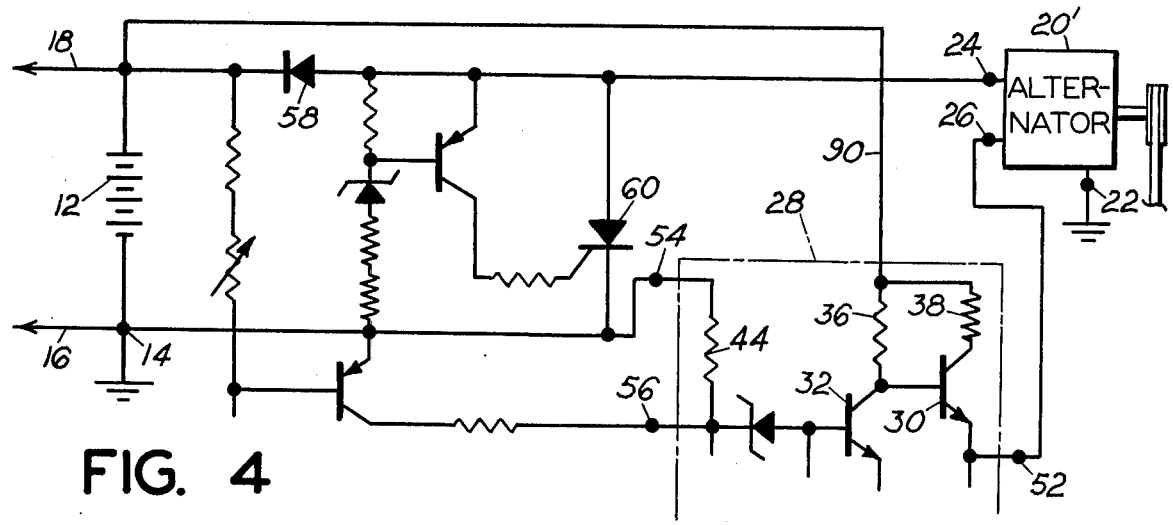
FIG. 4

DUAL BATTERY CHARGE CONTROL

This is a continuation of application Ser. No. 477,593, filed June 10, 1974, now abandoned.

BACKGROUND OF THE INVENTION

This invention relates to battery charging, and more particularly to the charging of batteries connected together in series.

Many electrical systems utilize batteries connected in series to provide two output voltages. For example, diesel powered trucks, marine equipment, and others utilize a 24 volt or higher supply for starting engines, etc., but require only 12 volts for the remaining electrical components.

In such systems there is presented the problem of providing proper charging of each battery, since they require different amounts of charge. For example, the battery providing the higher voltage output for engine starting generally is used much less than the other and therefore it requires only a few minutes of charge to replace the loss. The battery providing the lower voltage output also is used for engine starting, but has the added demand of the remaining electrical system, and therefore it requires more charge.

Thus, for example, if a regulated 24 volt charge from an alternator is applied at the positive terminal of the higher voltage output battery, the latter becomes fully charged before the lower voltage output battery. However, the voltage regulator sees only the voltage drop across the series-connected batteries, and therefore allows the alternator to continue charging until said voltage is satisfied. As a result, the higher voltage battery is overcharged and the lower voltage output battery is undercharged, causing premature damage to both batteries.

Efforts have been made heretofore to achieve proper charging of each battery in dual battery systems. For example, switching systems have been provided for connecting the batteries in series for starting engines, etc., and for connecting batteries in parallel for charging. However, the additional electrical resistance contributed by the switch results in the higher voltage output battery being maintained in an under-charged condition. The use of two alternators in an attempt to balance the loads, also has been found unacceptable, Special alternators of complex and costly circuitry and physical design have been found to be economically impracticable.

Equally unsatisfactory have been the attempts to circumvent the battery charging problem by using high powered 12 volt starter systems, or by utilizing straight 24 voltage systems for charging and for all other components of the electrical system.

SUMMARY OF THE INVENTION

In its basic concept, this invention provides a charge control for series-connected batteries in which the voltage drop across the battery providing the higher voltage output is utilized at a predetermined value to switch the charging current from the series-connected batteries to only the battery providing the lower voltage output.

It is by virtue of the foregoing basic concept that the principal objective of this invention is achieved; namely, to overcome the aforementioned difficulties and disadvantages of prior charging systems.

Another object of this invention is the provision of a dual battery charge control which is operable with conventional generators and alternators as well as with conventional voltage regulators.

Still another objective of this invention is the provision of a dual battery charge control which functions automatically to achieve proper charging of each battery in a dual battery system.

A further object of this invention is the provision of a dual battery charge control which is of simplified construction for economical manufacture.

The foregoing and other objects and advantages of this invention will appear from the following detailed description, taken in connection with the accompanying drawing of preferred embodiments.

BRIEF DESCRIPTION OF THE DRAWING

FIG. 1 is a schematic electrical diagram showing associated with series-connected batteries and a conventional alternator a dual battery charge control embodying the features of this invention.

FIG. 2 is a fragmentary schematic electrical diagram showing a modification of the charge control of FIG. 1 to accommodate use of a conventional original equipment voltage regulator.

FIGS. 3 and 4 are fragementary schematic electrical diagrams showing a modification of a conventional voltage regulator circuit and alternative connections thereof to the battery and alternator system for association with the charge control of this invention.

DESCRIPTION OF THE PREFERRED EMBODIMENTS

Referring to FIG. 1 of the drawing, two batteries 10 and 12 are shown connected together in series. The negative terminal of battery 10 is connected to common ground, the positive terminal of said battery and the negative terminal of the battery 12 are connected together at a common junction 14. An electrical conductor 16 extends from the junction to supply an electrical system with the lower voltage output from battery 10. The positive terminal of the other battery 12 is connected to an electrical conductor 18 which supplies an engine starter or other load with the higher voltage output provided by the series-connected batteries. Thus, for example, with each battery providing a 12 volt output, the conductor 16 provides 12 volts to an electrical system, which the conductor 18 provides 24 volts to an engine starter or other electric load.

FIG. 1 also illustrates a conventional alternator 20 which is mechanically activated by a vehicle or other drive engine, as by coupling thereto through a belt and pulley arrangement, as will be understood. It will be appreciated that the alternator may be replaced by a conventional generator. The alternator illustrated is provided with a ground terminal 22 for connection to common ground; a power output terminal 24 for delivering charging current to the batteries; and a field terminal 26 for connection of power from a voltage regulator 28.

The voltage regulator illustrated is of conventional design and includes the transistor 30 which is biased normally on, the transistor 32 which is biased normally off, the resistors 34, 36 and 38, uncontrolled diode 40, zener diode 42, and voltage detecting resistors 44, 46 and 48. The voltage regulator is provided with a ground terminal 50 for connection to common ground; a field supply terminal 52 for connection to the field windings of the alternator; a power input terminal 54; and a sensing signal input terminal 56 for connection of an external sensing signal.

Ordinarily, the sensing signal terminal 56 of conventional, original equipment regulators is not avilable for external connection. Accordingly, the charge control circuit and voltage regulator circuit of FIG. 1 are manufactured as an integral unit.

The power output terminal 24 of the alternator is connected to the positive terminal of battery 12 through an uncontrolled diode 58. This diode functions upon attainment of a predetermined voltage at the output terminal 24 to conduct charging current to the positive terminal of battery 12, thence through said battery to the common junction 14, thence through battery 10 to common ground.

In accordance with this invention, means is provided for switching the output terminal 24 of the alternator to the common junction 14 upon attainment of a predetermined voltage drop across the battery 12 providing the higher voltage output, whereby to direct charging current only through the battery 10 providing the lower voltage output. In the general concept of this invention, this is provided by electrically actuated switch means which removably connects the output of the generating means to said common junction, and by electrical switch actuator means which is connected across the battery providing the higher voltage output and which is responsive to a predetermined voltage drop across said battery to activate the switch means to connect the output of the generating means across only the battery providing the lower voltage output.

In the specific embodiment illustrated in FIG. 1, the electrically actuated switch means is provided by a silicon control rectifier 60 which interconnects the power output terminal 24 of the alternator and the common junction 14 between the batteries. The silicon controlled rectifier is normally off; hence, the switch means is normally open.

The electrical switch actuator means for turning on the silicon controlled rectifier 60 includes the voltage detecting resistors 62, 64 and 66, the zener diode 68, the transistor 70 which is biased normally off, and the resistor 72 which interconnects the transistor collector and the gate of the silicon controlled rectifier 60.

The charge control of this invention also may include a second electrical switch actuator means for turning off the silicon controlled rectifier 60 (returning the switch means to its normally open condition). In FIG. 1 this turn-off control includes the transistor 74 which is biased normally off, the resistor 76 which interconnects the transistor collector and the sensing signal terminal 56 of the voltage regulator, and the resistors 78, 80 and 82 which, by connection across the batteries 10 and 12, form therewith a bridge network.

The operation of the charge control illustrated in FIG. 1 is as follows: With the alternator 20 being driven mechanically by the engine, the normally conducting transistor 30 of the voltage regulator provides power through terminals 52 and 26 to the alternator fields, thereby producing charging current at the alternator output terminal 24. Since the silicon control rectifier 60 is not conducting, charging current from the output terminal cannot get through to the common junction 14. Accordingly, voltage continues to rise at the output terminal until the diode 58 conducts. Thereupon charging current is conducted through the series-connected batteries 12 and 10 to common ground. Both batteries thus are charged.

In the normal operation of the voltage regulator, when the voltage across the battery 10 providing the lower voltage output reaches a predetermined value, as sensed by the voltage regulator resistors 44, 46 and 48, zener diode 42 fires, causing the normally off transistor 32 to conduct. The normally on transistor 30 thus is turned off, causing the alternator fields to weaken and the output voltage to drop. When the voltage across the battery 10 providing the lower voltage output drops slightly, zener diode 42 ceases conduction, thereby turning off the transistor 32 and turning on transistor 30, allowing the alternator output voltage to be controlled.

When the voltage across the battery 12 providing the higher voltage output reaches a predetermined value, as sensed by resistors 62, 64 and 66, zener diode 68 is caused to fire, turning on transistor 70. Activation of this transistor effects activation of the silicon controlled rectifier 60. Charging current thus is directed from the output terminal 24 of the alternator to the common junction 14. Since the voltage at the output terminal 24 drops to a predetermined value lower than the voltage at the positive terminal of battery 12, the diode 58 ceases to conduct. Charging current through the battery 12 providing the higher voltage output thus is stopped. Charging current from the output terminal 24 thereupon is directed through the activated silicon controlled rectifier 60 to junction 14 to continue charging the battery 10 providing the lower voltage output. This occurs because, though the voltage at the base of transistor 70 drops to turn the latter off, thereby removing the control signal from the gate of the silicon control rectifier 60, the latter is conducting direct current and therefore continues in its activated state.

When the voltage at the output terminal 24 of the alternator drops to a predetermined value relative to the common junction 14, current stops flowing.

When the voltage across the battery 12 providing the higher voltage output drops (the voltage across the battery 10 providing the lower voltage output remains at regulated voltage), the base of transistor 74 goes negative to a predetermined value with respect to the common junction 14, as determined by the bridge network, transistor 74 is activated. This, in turn, effects firing of zener diode 42, thereby activating transistor 32 and deactivating transistor 30. The alternator output thus is stopped, thereupon the silicon controlled rectifier 60 is deactivated.

When the voltage across the battery 10 providing the lower voltage output starts to drop, the base of transistor 74 becomes more positive with respect to the common junction 14, whereupon transistor 74 is turned off. The voltage regulator thereupon assumes control and the voltage at the alternator output terminal 24 rises until diode 58 conducts, whereby once again to reestablish the series charge through the batteries 10 and 12.

It will be understood that the turn-off control for the silicon controlled rectifier may be omitted for some applications as, for example, when the battery providing the higher voltage output is used only for starting an engine and charging is not needed until after a subsequent start. In such applications the silicon controlled rectifier is turned off simply by stopping the engine.

FIG. 2 illustrates a modification of the turn-off control for the silicon controlled rectifier, to accommodate the use of an original equipment voltage regulator 28', rather than incorporating a voltage regulator in the charge control, as in FIG. 1. For this purpose a transistor 84 is interposed between the collector of transistor 74 and the power input terminal 54 of the voltage regulator. Thus, when the voltage across the battery 12 providing the higher voltage output drops, the base of transistor 74 goes negative with respect to the common junction 14, activating the transistor 74. This effects deactivation of transistor 84 which is biased normally on. Deactivation of transistor 84 removes power input to the regulator and effects deactivation of transistor 30, thereby stopping power to the alternator fields and deactivating the alternator and silicon controlled rectifier.

FIG. 3 illustrates a modification of the voltage regulator arrangement shown in FIG. 1. Thus, the conductor 86 interconnecting the resistors 36 and 44 in FIG. 1 is removed, and the voltage regulator power source is provided by the conductor 88 connected to the output terminal 24 of the alternator. This arrangement is desirable for situations wherein more efficient charging at the higher potential is required, as for example when the battery 12 providing the higher voltage output supplies other loads in addition to engine starting. Regulator sensing across battery 10, through transistor 74, is utilized as in FIG. 1.

FIG. 4 illustrates a further modification of FIG. 1, to accommodate the use of original equipment alternators 20' which are designed for the nominal voltage of the sum of the two series-connected batteries. In this arrangement, as in FIG. 3, the conductor 86 interconnecting the resistors 36 and 44 in the voltage regulator of FIG. 1 is omitted. However, power source for the voltage regulator is supplied through conductor 90 connected directly to the higher voltage terminal of battery 12.

From the foregoing it will be appreciated that the present invention provides a charge control of simplified and therefore economical construction which function effectively to provide precise charging of each of a pair of batteries connected together in series, and is versatile in its applicability to a wide variety of conventional charging systems.

It will be apparent to those skilled in the art that various changes may be made in the type, number, and arrangement of components described hereinbefore. For example, the control may be provided for use with positive ground systems, by substituting NPN type transistors for the PNP types illustrated, and reversing the polarities of the diodes. The original equipment voltage regulator 28' of FIG. 2 may be integrated with the associated control circuitry, if desired. The control may be associated with any desired combination of battery voltages other than the 12 volt batteries 10 and 12 described. For example, with battery 10 being 12 volts, battery 12 may be 6 volts to provide a total of 18 volts; 20 volts to provide a total of 32 volts; 24 volts to provide a total of 36 volts; and many other combinations. These and other changes may be made without departing from the spirit of this invention.

Having now described my invention and the manner in which it may be used, I claim:

1. A charge control device for external connection between first and second series connected batteries and the single output terminal of a voltage regulated, DC output, generating means, comprising:
   blocking diode means normally connecting the output terminal of the generator to that pole of the first of the batteries remote from the junction between the two so as to charge the pair of batteries in series;
   latchable electrically actuable switch means, operable when actuated to establish a low resistance direct current path between the output terminal of the generating means and the junction between the first and second batteries;
   electrical switch actuator means arranged for connection across the first of the batteries and responsive to a predetermined voltage drop across the first battery to actuate said switch means;
   said switch means latching on after actuation to maintain said low resistance direct current path between the generating means output terminal and the junction between the batteries so as to charge only the second battery of the pair during the flow of direct current in said path and irrespective of further voltage variations in the first battery.

2. The charge control of claim 1, wherein the switch means comprises a silicon controlled rectifier and the actuator means comprises a transistor switch circuit connected to the silicon controlled rectifier gate and operable at said predetermined voltage drop to activate the silicon controlled rectifier.

3. A charge control for a pair of batteries connected in series across electrical generating means, comprising:
   a. electrically actuated switch means arranged for removably connecting the output of the generating means to the junction between the series-connected batteries,
   b. electrical switch actuator means arranged for connection across the battery providing the higher voltage output and responsive to a predetermined voltage drop across said battery to activate the switch means to connect the output of the generating means across only the battery providing the lower voltage output, and
   c. second electrical switch actuator means arranged for connection across the series-connected batteries and responsive to the predetermined voltage drop across the battery providing the higher voltage output to deactivate the switch means.

4. The charge control of claim 3 wherein a voltage regulator is associated with the generating means for controlling the output of the latter, and the second electrical switch actuator means is responsive to said predetermined voltage drop across the battery providing the higher voltage output to deactivate the voltage regulator and switch means.

5. The charge control of claim 4 wherein the second electrical switch actuator means is also responsive to a predetermined voltage drop across the battery providing the lower voltage output to activate the voltage regulator and re-establish charging through the series-connected batteries.

6. The charge control of claim 5 wherein the switch means comprises a silicon controlled rectifier and the first named actual or means comprises a transistor switch circuit connected to the silicon controlled rectifier gate and operable at said predetermined voltage drop to activate the silicon controlled rectifier, and
   b. the second electrical switch actuator means comprises a transistor switch circuit connected to the voltage regulator and operable at the predetermined voltage drop across the battery providing the higher voltage output to deactivate the voltage regulator, and said silicon controlled rectifier, and also operable at a predetermined voltage drop across the battery providing the lower voltage output to activate the voltage regulator and to re-establish charging through the series-connected batteries.

7. The charge control of claim 5 wherein the voltage regulator has a power input terminal arranged for connection to the junction between the series-connected batteries and a sensing signal intput terminal arranged for connection to the second electrical switch actuator means.

8. The charge control of claim 5 wherein the voltage regulator has a power input terminal arranged for connection to the power output terminal of the generating means and a sensing signal input terminal arranged for connection to the second electrical switch actuator means.

9. The charge control of claim 5 wherein the voltage regulator has a power input terminal arranged for connection to the higher voltage terminal of the series-connected batteries and a sensing signal input terminal arranged for connection to the second electrical switch actuator means.

10. The charge control of claim 5 wherein the voltage regulator has a power input terminal arranged for connection to the second switch actuator means.

11. The charge control of claim 3 wherein
 a. a voltage regulator is associated with the generating means for controlling the output of the latter, the voltage regulator having the power input terminal and a sensing signal input terminal,
 b. the switch means comprises a silicon controlled rectifier and the first named actuator means comprises a transistor switch circuit connected to the silicon controlled rectifier gate and operable at said predetermined voltage drop to activate the silicon controlled rectifier, and
 c. the second electrical switch actuator means comprises a transistor switch circuit connected to the sensing signal input terminal of the voltage regulator and operable at said predetermined voltage drop across the battery providing the higher voltage output to deactivate the voltage regulator, and said silicon controlled rectifier, and also operable at a predetermined voltage drop across the battery providing the lower voltage output to activate the voltage regulator and to re-establish charging through the series-connected batteries, the power input terminal of the voltage regulator being arranged for connection to the junction between the series-connected batteries.

12. The charge control of claim 3 wherein
 a. a voltage regulator is associated with the generating means for controlling the output of the latter, the voltage regulator having a power input terminal,
 b. the switch means comprises a silicon controlled rectifier and the first named actuator means comprises a transistor switch circuit connected to the silicon controlled rectifier gate and operable at said predetermined voltage drop to activate the silicon controlled rectifier, and
 c. the second electrical switch actuator means comprises a transistor switch circuit connected to the power input terminal of the voltage regulator and operable at said predetermined voltage drop across the battery providing the higher voltage output to deactivate the voltage regulator, and said silicon controlled rectifier, and also operable at a predetermined voltage drop across the battery providing the lower voltage output to activate the voltage regulator to re-establish charging through the series-connected batteries.

* * * * *

UNITED STATES PATENT OFFICE
CERTIFICATE OF CORRECTION

PATENT NO. : 4,041,363
DATED : August 9, 1977
INVENTOR(S) : Ralph E. Scheidler

It is certified that error appears in the above-identified patent and that said Letters Patent are hereby corrected as shown below:

Column 2, line 47, change "which" to --while--.

Column 6, line 56, change "actual or" to --actuator--;

line 65, delete the comma (first occurrence);

line 68, delete "and".

Column 8, line 4, delete the comma;

line 8, delete "and";

line 30, delete the comma.

Signed and Sealed this

First Day of November 1977

[SEAL]

Attest:

RUTH C. MASON
Attesting Officer

LUTRELLE F. PARKER
Acting Commissioner of Patents and Trademarks